US007117056B2

(12) United States Patent
Balic

(10) Patent No.: US 7,117,056 B2
(45) Date of Patent: Oct. 3, 2006

(54) CNC CONTROL UNIT WITH LEARNING ABILITY FOR MACHINING CENTERS

(76) Inventor: Joze Balic, Cesta Proletarskih brigad 63, 2000 Maribor (SI)

( * ) Notice: Subject to any disclaimer, the term of this patent is extended or adjusted under 35 U.S.C. 154(b) by 0 days.

(21) Appl. No.: 11/120,018

(22) Filed: May 2, 2005

(65) Prior Publication Data

US 2005/0251284 A1 Nov. 10, 2005

Related U.S. Application Data

(63) Continuation-in-part of application No. 10/217,043, filed on Aug. 12, 2002, now abandoned.

(30) Foreign Application Priority Data

Mar. 27, 2002 (SI) .............................. P-200200088

(51) Int. Cl.
*G06F 3/00* (2006.01)
(52) U.S. Cl. ..................... 700/104; 700/95; 700/121; 706/6
(58) Field of Classification Search ................. 700/95, 700/104; 706/6
See application file for complete search history.

(56) References Cited

U.S. PATENT DOCUMENTS

| | | | | | |
|---|---|---|---|---|---|
| 5,136,686 | A | * | 8/1992 | Koza | 706/13 |
| 5,465,221 | A | * | 11/1995 | Merat et al. | 702/83 |
| 5,598,076 | A | * | 1/1997 | Neubauer et al. | 318/568.22 |
| 5,761,940 | A | * | 6/1998 | Moore et al. | 72/19.4 |
| 5,804,940 | A | * | 9/1998 | Erkens et al. | 318/560 |
| 5,917,726 | A | * | 6/1999 | Pryor | 700/95 |
| 6,366,831 | B1 | * | 4/2002 | Raab | 700/262 |
| 2002/0107822 | A1 | * | 8/2002 | Helmick | 706/26 |
| 2003/0187624 | A1 | * | 10/2003 | Balic | 703/1 |

FOREIGN PATENT DOCUMENTS

| | | |
|---|---|---|
| DE | 4011591 | 10/1990 |
| EP | 0726509 | 8/1996 |

OTHER PUBLICATIONS

"Artificial Neural Networks in Manufacturing: Concepts, Applications, and Perspectives" —Huang et al, IEEE 1994.*
(Neural-Network-Based Numerical Control for Milling Machine), Joze Balic, 2004 Kluwer Academic Publishers, Journal of Intelligent and Robotic Systems.

* cited by examiner

*Primary Examiner*—Leo Picard
*Assistant Examiner*—Michael D. Masinick
(74) *Attorney, Agent, or Firm*—St. Onge Steward Johnston & Reens LLC

(57) ABSTRACT

A computer numerical control unit with learning ability solves the problem of automatic and intelligent generating of numerical control programs for computer numerical control machining centers for milling, drilling and similar operations. The key module of the computer numerical control unit is a neural network (NN) device that learns to generate the numerical control programs through an neural network teaching module. Upon completion of learning process the neural network device can generate automatically, without any intervention of the operator, merely on the basis of the CAD 2D, 2,5D or 3D part models, taken from a conventional CAD/CAM system, various new numerical control programs for different parts, which have not been in the machining process before. The computer numerical control control unit with learning ability is suitable especially for machining centers intended for milling, including face milling (rough), contour milling (rough), final milling following the contour and in Z-plane, final contour 3D milling, contour final milling, milling in Z-plane, final contour milling on the equidistant, and milling of pockets; drilling, including normal drilling, deep drilling, and center drilling; and reaming, sinking and threading.

6 Claims, 15 Drawing Sheets

CNC CONTROL UNIT WITH LEARNING ABILITY FOR MACHINING CENTERS

PRIOR APPLICATION

Applicant claims priority benefits under 35 U.S.C. §120 as a continuation-in-part of U.S. patent application Ser. No. 10/217,043 filed Aug. 12, 2002 now abandoned, which claims priority benefits of Slovenian Patent Application No. SI P-200200088 filed Mar. 27, 2002.

FIELD OF THE INVENTION

The invention relates to manufacturing technology, in particular to programming and numerical control of machining centers for milling, drilling and similar operations.

The conventional control units for the Computer Numerical Control (CNC) machining tools, especially the control units for machining centers intended for milling, drilling and similar operations, typically contain a microcomputer, consisting of a decoder, a position memory, a function memory, an interpolation program, and a functions program. The Numerical Control (NC) program is fed to the computer either through a punched tape reading device or in a Direct Numerical Control (DNC) mode through an interface. A manual input is also foreseen, but it is limited to smaller corrections of the numerical control program or to individual changes of technological parameters. The numerical control functions program comprising the technological data is sent to the numerical control machine through an adaptable interface. The numerical control positions program is send through a comparison unit and an amplifier unit to a step motor of the numerical control machine. Either the support for the part or the cutting tools of the machine can be moved following the geometric data. A position meter perceives every movement and sends a regulated position value to a position-measuring module, which forwards the data to comparison unit, where the difference between the actual and the desired position is calculated. The geometric data is obtained from the numerical control program for the part and is processed in the position loop.

A new numerical control program must be supplied to the computer numerical control system for each part, as the control system does not remember the operations already performed and can not automatically change the program parameters, with the exception of some technological parameters, for example the cutting conditions, corrections of tool length, offset of reference or zero points.

The use of modern CAD/CAM systems does not solve this problem. These systems just enable that a new NC control program is performed faster and more reliably. Some systems allow saving of certain processing strategies, nevertheless, the intervention of skilled numerical control programmer is still necessary. The programs made in this way cannot be used directly for the computer numerical control of the machine tool; they must be adapted in a post-processing phase. The task of this phase is to modify a generally valid file of the tool path (CLDATA) for each machine tool, i.e. for each computer numerical control. Every NC control program and every change must go through such post-processing phase.

The technical problems indicated above can be solved by an numerical control system with learning ability and the ability of automatic intelligent generation of numerical control programs which follow the computer read engineering drawings and/or 3D CAD models of the parts to be processed.

In the patent DE4O1 1591 (JP19890098177) a numerical control unit with integrated learning function is described. The numerical control unit makes a teaching numerical control program that is compared with the inserted numerical control program to make the resulting numerical control program. The actual numerical control program can be changed or supplemented by the machine operator who chooses the "teaching" way of operation and then supplements the numerical control program. The solution requires the intervention of a skilled operator or a programmer.

The patent application US2001/0000805 A1 describes a device for generating a tool path on NC machines and the pertinent numerical control system. First, the device identifies the geometric feature characteristics of a CAD model, and then it chooses the most suitable tool path amongst the stored processing procedures (machining cycles, sub-programs). Only the machining procedures, which have been defined as typical processing procedures for particular sub-programs, are available for selection.

The patent U.S. Pat. No. 6,022,132 describes a method and a device for programming the computer numerical control machine tools on the basis of a probe built-in into the main spindle of the machine tool. The probe is moved manually following the required profile (tool path). After receiving the data the computer generates an automatic numerical control program, which gives the commands for the movement to the computer numerical control system. This method does not include any elements of artificial intelligence.

The patent U.S. Pat. No. 6,314,412B1 describes an evolutional control of a driving machine in a vehicle with respect to chosen coefficients. A scheme of the control unit is constructed on the evolution principles. The system is adapted for building-in into a vehicle.

The patent EP0726509A1 describes an interactive programming system for computer numerical machine tools. It allows the operator to choose interactively between different control programs and procedures, which are then automatically composed into a numerical control program. The solution requires the intervention of an operator or a programmer.

The patent JP2001034155 describes a learning method and a device made for this purpose. A special man-machine interface is built-in into the control unit of the machine to enable a conversation with the user and the learning process.

The patent JP 11242510 describes a device and a method for generating the numerical control programs. A special device saves the data about the part, pertinent coordinates, junction's characteristics and the time necessary for assembling the individual electronic components. The solution enables a reduction of time needed for preparing the numerical control programs and a reduction of mistakes arising at preparing the programs.

In all the solutions presented above manual intervention of a skilled operator or a programmer is necessary for preparing the numerical control program for computer numerical control machine tools. The systems cannot create the numerical control programs for the parts, which are not saved in the database, and cannot choose and use the machining strategies automatically.

DETAILED DESCRIPTION OF THE INVENTION

Figure 1:
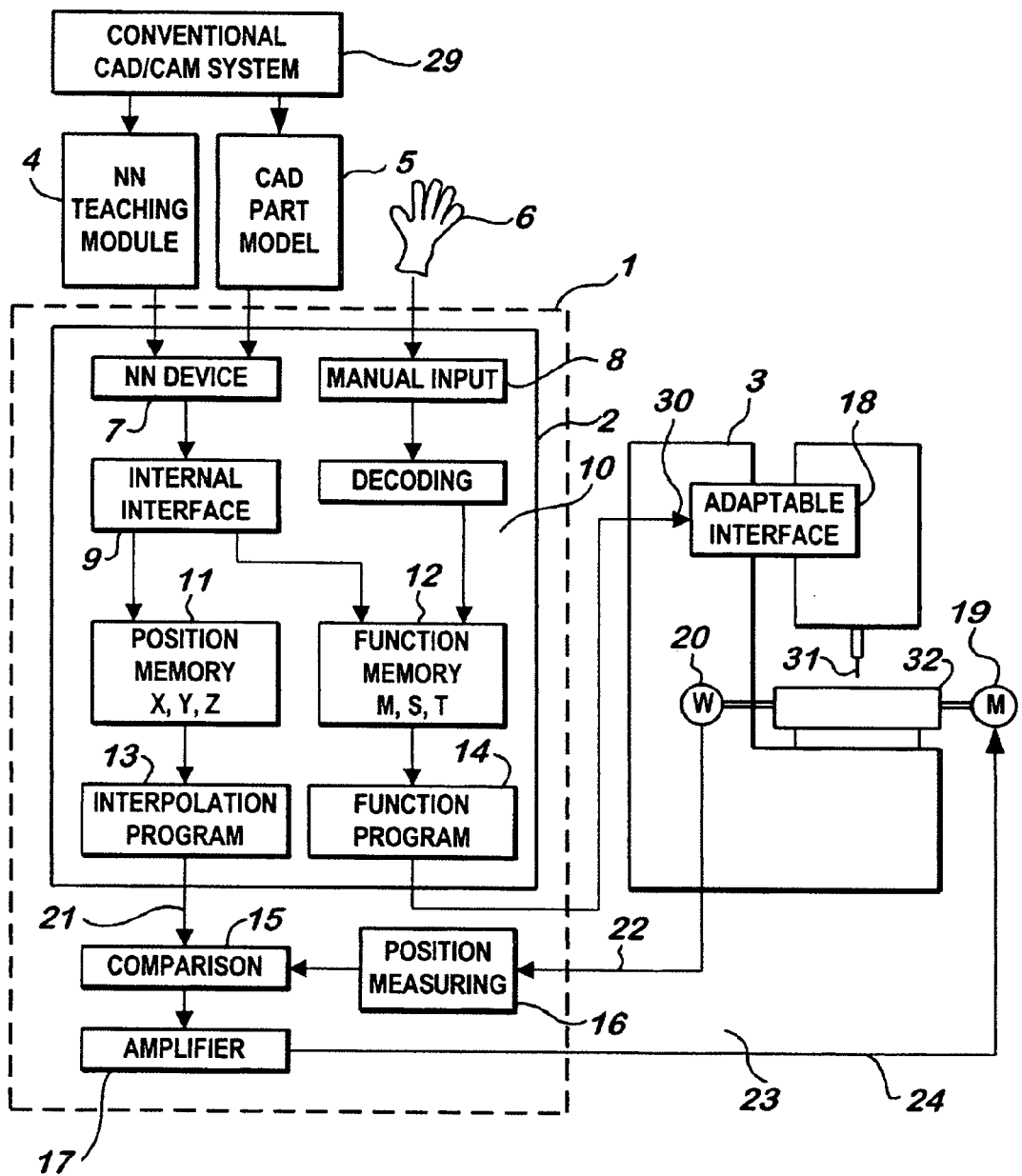
FIG. 1 is a block diagram of a Computer Numerical Control unit with learning ability for machining centers according to present invention.

The object of the invention is to provide an improved programming and numerical control for machining centers intended for milling, drilling and similar operations which has the learning ability and the ability of automatic intelligent generation of numerical control programs. The said object of the invention is achieved by means of a neural network (NN), which learns to generate numerical control programs through a teaching module. Consequently, the numerical control programs can be generated automatically without any intervention of the operator, merely on the basis of the 2D, 2,5D or 3D computer models of the parts to be processed.

The objects, advantages and features of the invention will be presented in detail by means of drawings in the following figures:

The learning process and the automatic intelligent generation of the numerical control programs 28 take place in a neural network (NN), built-in in a special neural network device 7, which receives the learning instructions from the neural network teaching module 4. The neural network teaching module 4 is not a constituent part of the computer numerical control unit 1 and works independently. Upon completion of learning process the neural network device 7 can generate automatically, merely on the basis of the CAD part model 5, coming from conventional CAD/CAM system 29, and without any intervention by the operator, various new numerical control programs 28 for different parts, which have not been in the machining process before.

The numerical control programs 28 are fed from the neural network device 7 to a modified microcomputer 2, which includes internal interface 9 for transmission of numerical control programs 28 to a position memory 11 and to a function memory 12. To the function memory 12, the manual commands 6 from the manual input module 8 can be fed as well, to wit through the decoding module 10. The commands 6 are mostly of technological nature, i.e. feed rate, revolution speed, switch on/off of cooling liquid etc.

The teaching data for the neural network device 7 come from a special teaching module 4, which is not a constituent part of the computer numerical control control unit 1. The task of the teaching module 4 is to teach the neural network in the neural network device 7 the principles and the technology of numerical control programming for all the machining operations on computer numerical control machining centers, above all for milling, drilling and similar operations.

In general, different neural network systems and different software products, also software developed for commercial purposes, can be applied. However, if special criteria have to be considered and met in machining processes, e.g. costs, time, quality of cutting, tool life, high speed cutting etc., the neural networks developed especially for specific purposes should be used.

Figure 3:
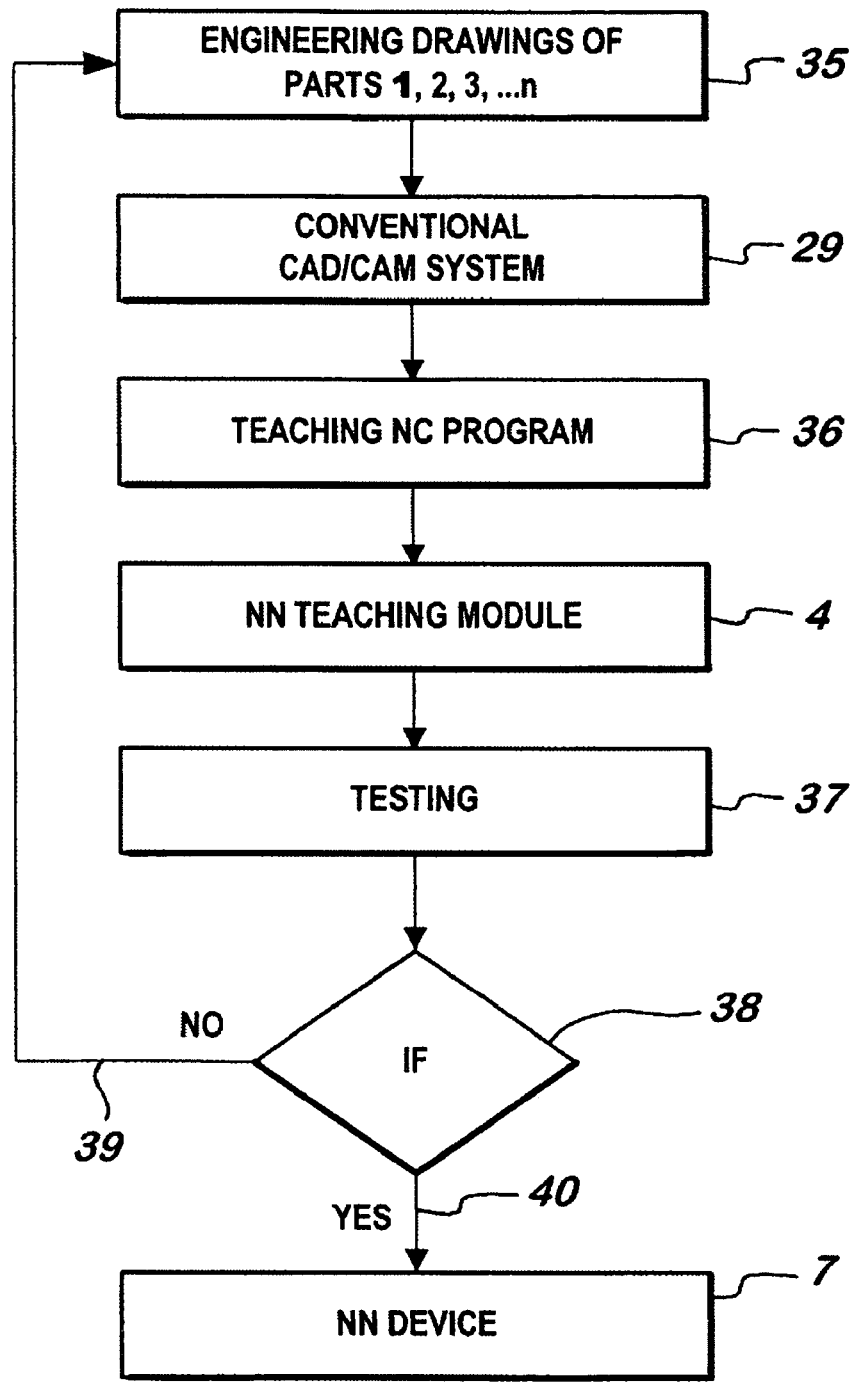
FIG. 3 is a flow chart of learning and generating the neural network according to the present invention.

The schematic diagram of the neural network device 7 according to the invention is shown in FIG. 3. The neural network device 7 consists of a module 25 designed to recognize geometric and technological features from CAD part model 5 and to generate the features based CAD part model 26. The CAD part model 26 is fed to the neural network milling module 27, which has before that, namely in the learning phase, been instructed by the neural network teaching module 4 to generate the specific numerical control program 28 for specific machining operation, e.g. for milling or drilling or similar operation.

In the learning phase, the N7N device 7 is connected to the teaching module 4 designed for instructing the neural network (NN). The teaching module 4 takes the data from conventional, commercially available CAD/CAM system for programming the numerical control/computer numerical control machine tools. By means of a conventional CAD/CAM system 29, the teaching numerical control programs 36 are prepared for different parts, defined in engineering drawings module 35, and are sent to the teaching module 4. In the decision module 38, subsequent to the testing module 37, the decision is taken on the success of teaching. In case that the decision is NO, the path 39 is active and the repetition of the teaching process takes place. If on the other hand the neural network device 7 has learned enough, the path 40 is active and the generated neural network is sent to the neural network device 7.

Figure 4:
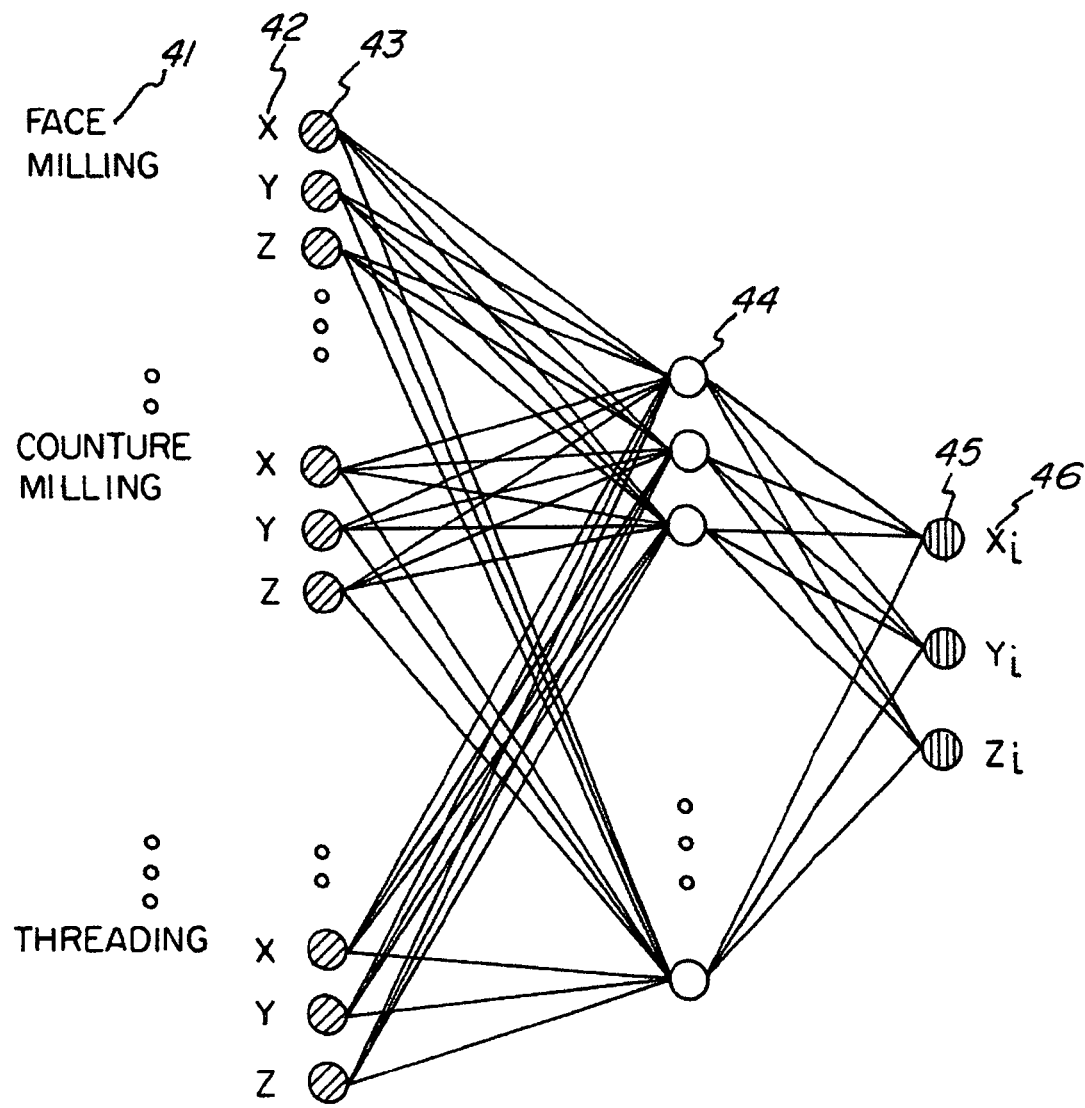
FIG. 4 shows a schematic layout of another embodiment of a neural network according to the present invention.

The functioning principle of the neural network device 7 is shown on FIG. 4. The neural network built-in in the neural network device 7 consists of three layers: the input layer 43, the hidden layer 44 and the output layer 45. On the input layer 43, the X-Y-Z sets 42 of coordinate points appear, representing the coordinate point values obtained from the modified CAD model 26 for individual machining operations types 41. The coordinate point values are determined according to special procedure. Through the intermediate hidden layer 44 the input coordinates are transposed into output layer 45 in a form of a set of coordinate points $X_1, Y_1, Z_1$ 46 representing the position values of the tool path for individual machining operations.

By means of the neural network the following machining operations can be carried out: face milling (rough), contour milling (rough), final milling after the contour and in Z-plain, final contour 3D milling, contour final milling, milling on Z-plain, final contour milling on equidistant, milling of pockets, normal drilling, deep drilling, centering, reaming and threading.

The computer numerical control control unit 1 according to the invention can function in either of the following two modes:

1. Programming mode, i.e. the mode of intelligent and completely automated processing of a CAD part model into a specific numerical control control program.

2. Learning mode, in which a learned numerical control programming system based on the principle of a neural network is entered through the teaching module 4 into the neural network device 7.

The principle of generation of the numerical control program is shown in FIG. 4. In the programming mode, the computer numerical control control unit 1 gets the data package of the CAD part model 5 from the conventional, commercially available CAD/CAM system 29 intended for programming the computer numerical control machines. The model is then transmitted to the neural network device 7, which identifies and classifies the individual geometric and technological features 25 of the CAD part model. Based on these characteristic features a new CAD part model 26 is built, which is transmitted to the neural network milling module 27, where on the basis of learned intelligent procedures the most suitable machining operations and cutting parameters (cutting speed, feed-rate and the depth of cutting) with respect to chosen conditions (machining time, surface quality, machining costs) are defined.

The output of the neural network milling module 27 is the numerical control program 28 for the processed part, which includes the geometric data about the mode of cutting tool path (linear G01 or circular G02/G03 interpolation), the coordinates of the cutting tool path (e.g. milling cutter), the technological data (revolution speed, feed-rate, depth of cutting) and auxiliary data (coordinates of reference, zero and starting points, direction of rotation of the main spindle M02/M03, change of cutting tools M06, etc.).

The data is then transmitted to internal interface 9, which splits the data in the numerical control program into tool path data (coordinates of movement in axis X, Y, Z and/or rotation A, B, C around coordinate axis X, Y, Z) saved in position memory 11 and into functions data (M, S, T) saved in function memory 12.

The numerical control functions program 14, which contains the technological data, is transmitted through adaptable interface 18 to the numerical control machine 3. The numerical control position program is then sent through the comparison unit 15 and the amplifier unit 17 to the step motors 19 of the numerical control machine 3. Either the machine tool slide 32 or the cutting tools 31 can be moved in accordance with geometric data 24. The position meter 20 perceives the movement and sends a regulated value 22 into the position-measuring module 16, which transmits the data to comparison unit 15, where the difference between the actual and the programmed position is calculated.

The geometric data are obtained from the numerical control program 28 for each part and are treated in the position regulation circle 23.

In the learning mode, the learned numerical control programming system based on the principle of a neural network is fed to the neural network device 7 through the teaching module 4, which conducts the teaching of the neural network device 7. The functioning of the neural network module is schematically shown in FIG. 3.

The origin for the teaching process is the engineering drawing 35 of a prismatic part, suitable for processing on machining centers, designed for milling, drilling and similar operations. First, the teaching numerical control program 36 is generated by the conventional CAD/CAM system 29 and sent to the neural network teaching module 4. Then, testing 37 of the obtained numerical control program is performed. In the decision module 38, the decision is brought on whether the numerical control control program is suitable and whether the neural network in the neural network teaching module 4 has learned enough. In the beginning the statement NO 39 is valid and the teaching process is repeated using the engineering drawing 35 of another part. In such a way the series of teaching cycles is performed until the testing 37 shows, that the decisional condition in the IF module 38 is fulfilled, i.e. that the state 40 is accomplished. Here, the teaching process of the neural network module ends and the learned neural network is transmitted into the neural network device 7.

The computer numerical control unit 1 can learn how to generate the numerical control programs for the following machining procedures: milling, including but not limited to face milling (rough), contour milling (rough), final milling following the contour in Z-plane, final contour 3D milling, contour final milling, milling on Z-plane, final contour milling on equidistant, and milling of pockets; drilling, including but not limited to normal drilling and deep drilling; centering; reaming; sinking; and threading.

The neural network device 7 can be built-in into any computer numerical control unit for milling machines as shown in FIG. 1. The standard parallel data transmission is used. In case that it is not possible to reprogram the internal interface 9, the neural network device must be connected to existing DNC interface, which is a constituent part of every computer numerical control control. The neural network teaching module 4 is connected to the neural network device 7 by means of a standard serial interface. The CAD part model 6 is sent to the neural network device 7 through a standard communication interface.

For teaching of the neural network device 7 through the teaching module 4, different commercially available CAD/CAM programming systems 29 can be used, for example Unigraphics Solution, I-Deas, Catia, HyperMill and the like. Further, to meet particular criteria during machining, such as costs, time, quality of cutting, tool life, and high speed cutting, specially developed neural networks may be used.

In one embodiment of the present invention, the neural network consists of three different neural networks, connecting together a first neural network used to predict a tool path strategy for milling and similar machining operations; a second neural network used to predict surface quality (roughness) and to optimize technology parameters, taking a surface complexity index into account; and a third neural network used for technological optimization of the machined surface and for recognition of surface patches, which are difficult to machine.

Figure 15:
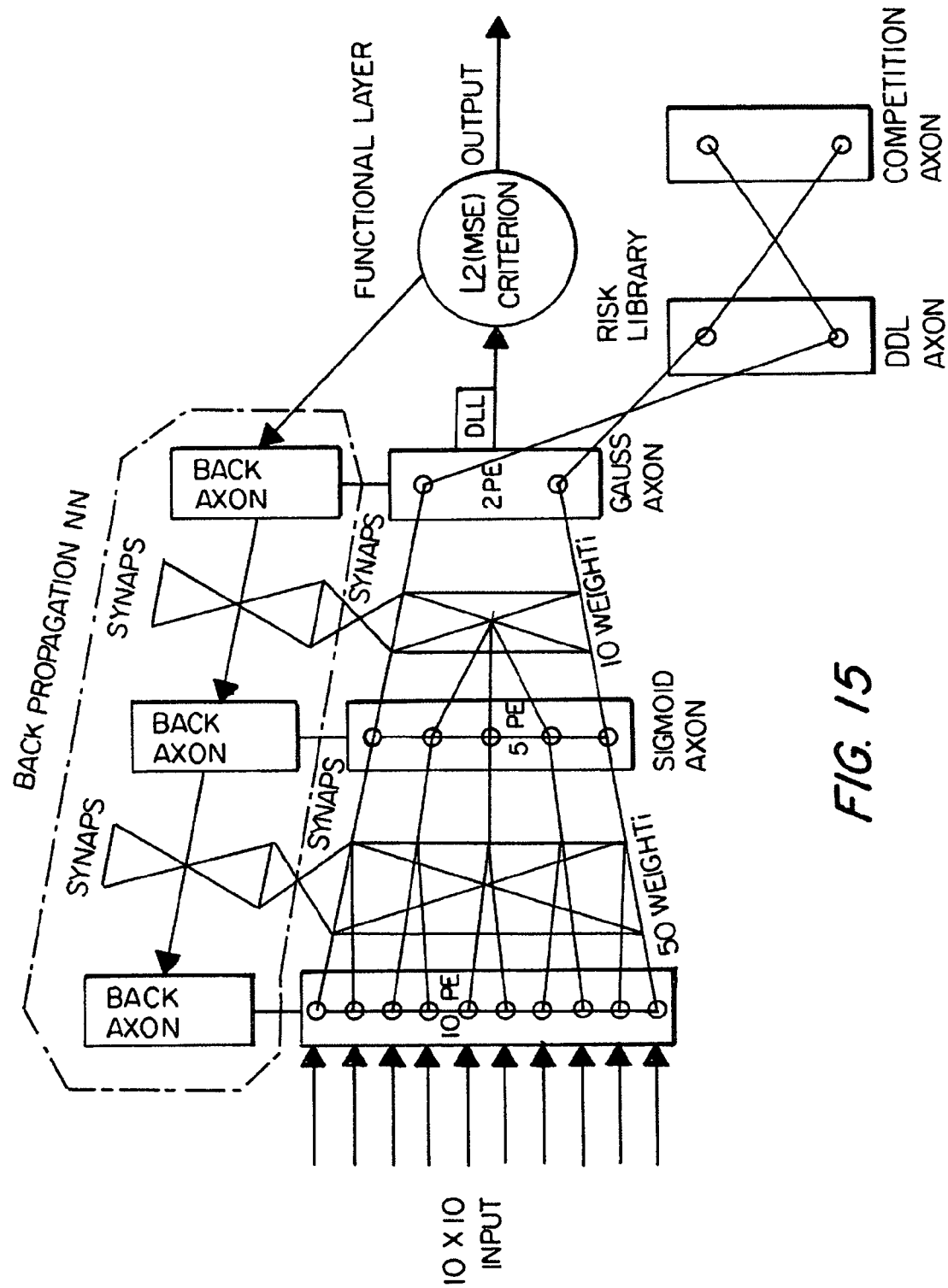
FIG. 15 shows a schematic layout of another embodiment of a neural network according to the present invention.

In one example, to build this neural network, a self-organizing model (SOM) was used, which can learn from cases. Its output is a probability value which identifies the milling strategy that is the best fit to the constraints. In our system the constraint was minimum surface roughness $R_a$ (μm). But that does not minimize the machining time. This neural network consists of three layers, as shown in FIG. 15: the input layer, the hidden layer and the output layer. The input layer receives the coordinates of points ($X_i$, $Y_i$, $Z_i$) obtained from the modified CAD model for individual types of machining operation. These points are determined by a special procedure. They pass through the intermediate hidden layer and appear on the output as new points ($X_o$, $Y_o$, $Z_o$) which represent the tool path for each machining operations.

In one embodiment of the present invention, neural network may be used to predict surface quality and optimize technological parameters. As the identification and classification of geometrical features is not sufficient for successful prediction of a suitable milling path strategy, the surface complexity index (SCI) may be employed to identify and measure those parts of the surface which are very difficult to machine. The SCI has a strong relation to surface roughness $R_a$ (μm), which was discovered using multi-layer processor neural network (MPL). An adaptive teaching algorithm with gradient descent learning in a back-propagation layer was used. The neural network has 3 layers as shown in FIG. 15 and was built in the NeuroSolutions environment. The first layer consists of 3 basic axons, the second layer is a back-propagation layer for calculation of error in the desired output of the NN, and the third layer is a gradient-search layer. The task of this layer is adaptation of weights for single element using the gradient descent functional layer axon.

Some specially developed features of this neural network were: a functional layer for definition of error criteria; a risk library for estimation of results risk (DLL); and an end criterion for selection between neurons on the competition principle. Each layer is represented by an axon which is made up off several neurons. Back propagation is used to calculate the current local errors.

In another aspect of the present invention, a neural network is used for the recognition of surface patches. The task of this neural network is to configure the topology of the machining surface by connecting of surface patches into a grid, which represent subsurfaces which can be machined by a relatively uncomplicated tool path. This neural network splits the surface into subsurfaces favorable for machining and suggests the best milling strategy to achieve the minimum surface roughness $R_a$ (μm). These subsurfaces combine data about geometry zones suitable for machining technology. The surfaces are represented in ASCII format to decrease the amount of geometrical information.

Figure 5:
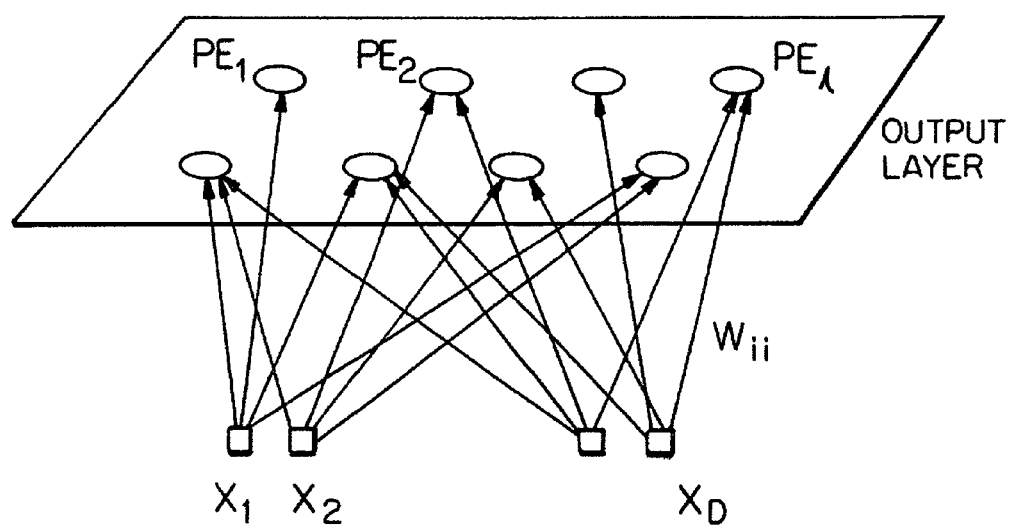
FIG. 5 shows a self organizing map of the neural network of FIG. 4.

As shown in FIG. 5, Kohonen self-organizing map (SOM) of an neural network get its information from an input vector of data. There is no learning by the network, as it is usually understood. This neural network operates using "hard" or "soft" competition between neurons (PE). Wining neuron represents one part of the input vector of defined characteristic. The topology of such an neural network is very simple in one layer, with nonlinearity in the selection of the wining neurons. A teaching procedure is not necessary because weights are defined in advanced. This neural network was also built in the NeuroSolution environment.

Figure 6:
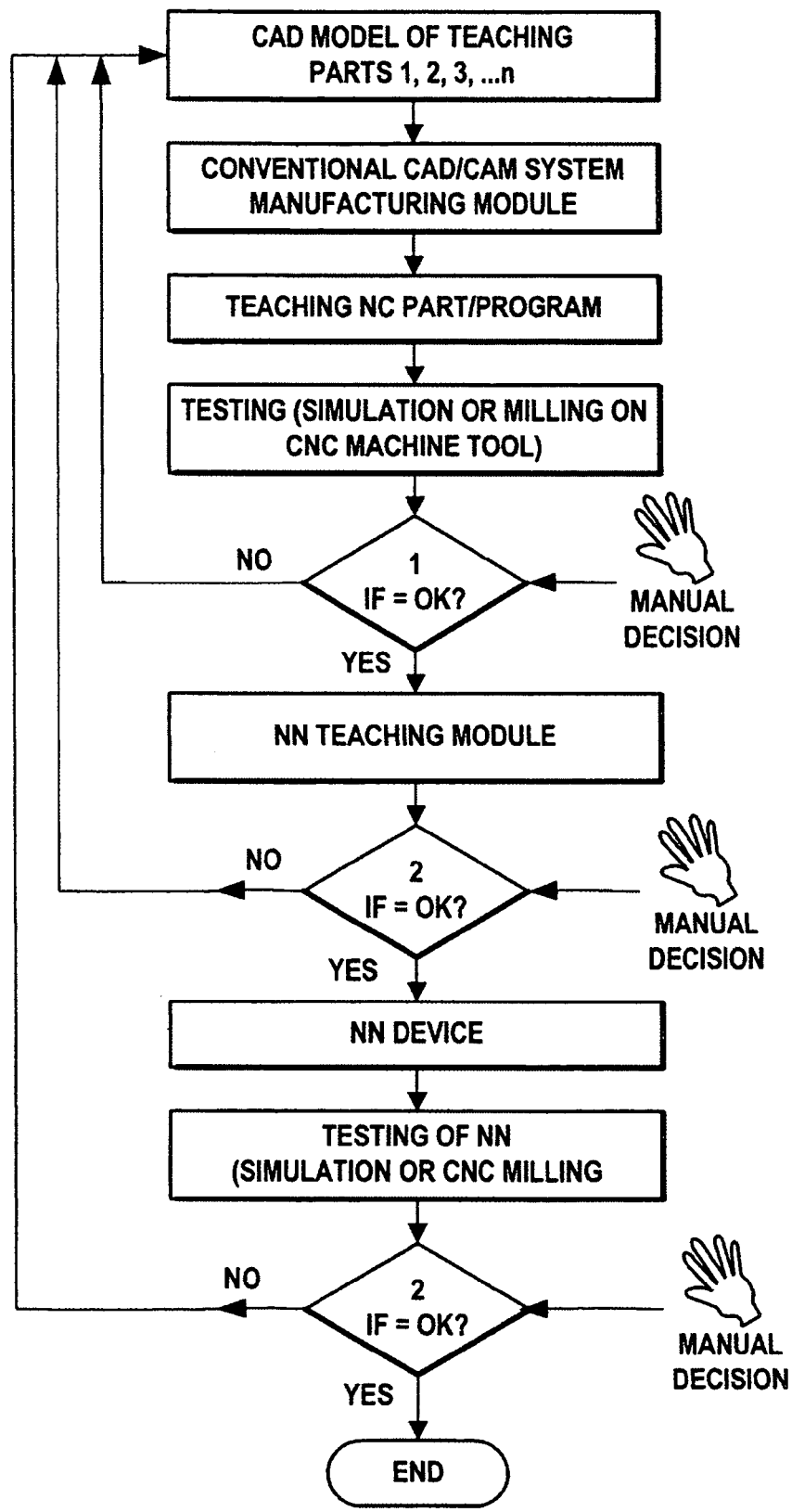
FIG. 6 shows a schematic layout of teaching the neural network according to the present invention.

In the teaching mode the learning numerical control programming system is put into the neural network device. Teaching the neural network device is performed in a special neural network teaching module. The principle of neural network teaching is shown in FIG. 6.

In the learning phase, the neural network device is connected to the teaching module. The input is the CAD model of each individual part that is prepared using a conventional, commercially available CAD system. There are two possibilities in the testing stage: to simulate the machining process or milling of a real workpiece on a computer numerical control machine tool.

In the first decision step (No. 1 in FIG. 6) the program determines whether the testing stage was satisfactory. Answer NO means that proposed milling strategy is not good for teaching the neural network. YES means that the proposed milling strategy is good enough for teaching, and it is sent to the neural network device. In the second decision step (No. 2 in FIG. 6) the program comes to a verdict on the success of the teaching mode.

Figure 7:
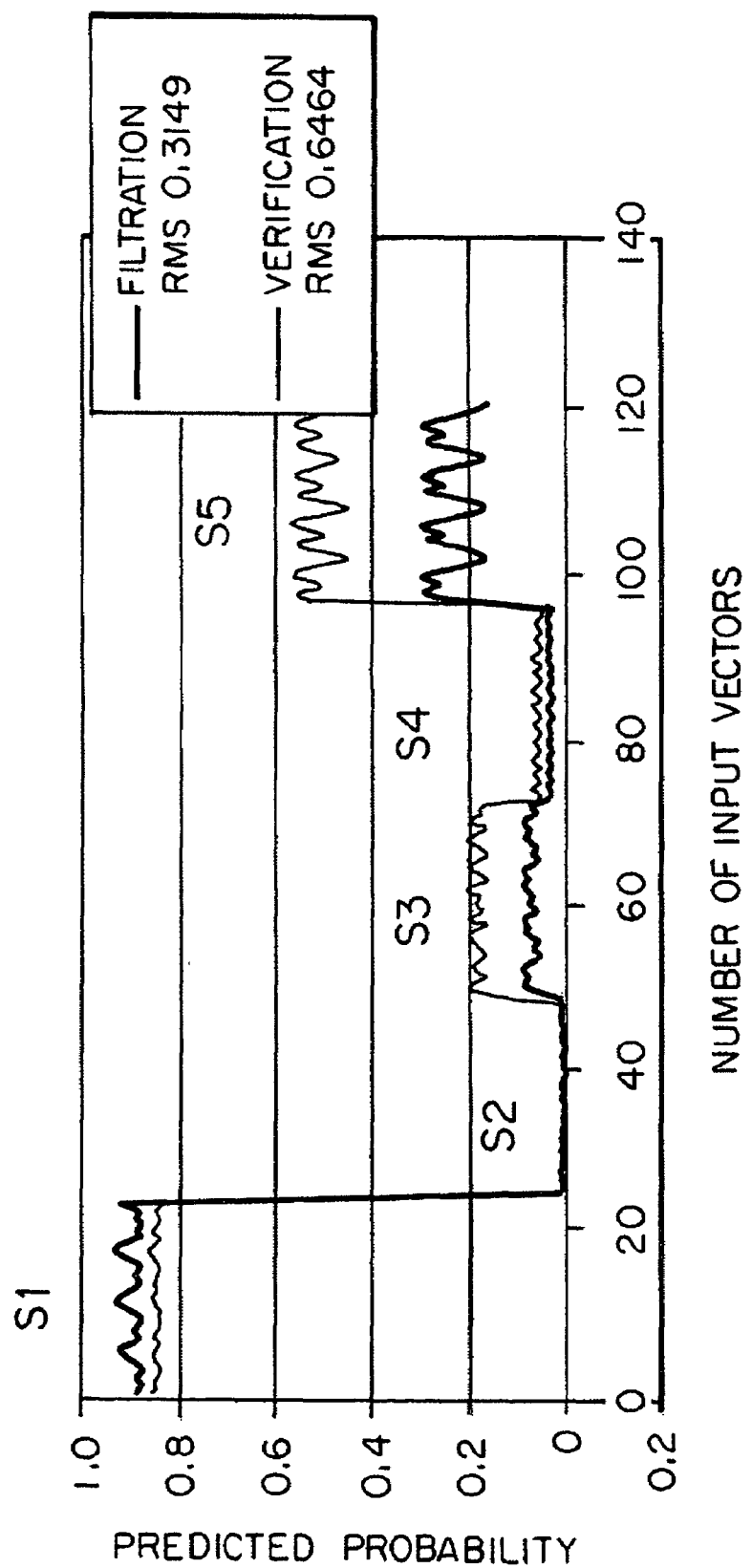
FIG. 7 is a graph showing a milling strategy developed by a neural network according to the present invention.

In one aspect of the present invention, the neural network is taught in order to achieve prediction of tool path strategy. Five typically-used 3D models to predict representative tool path strategies, which proved to be the best for achieving the required surface quality $R_a$ are shown in FIG. 7. The selected tool path milling strategies are (FIG. 7): (1) S1—Combination of profile finishing and Z-finishing (slope mode option); (2) S2—Profile finishing (2D and 3D); (3) S3—Profile finishing (scallop height mode); (4) S4—Z-level finishing; and (5) S5—Profile finishing (equidistant machining, constant in-feed).

The neural network approved the milling strategy S1 (FIG. 7) to be the best, with probability between 0.8 and 0.85. Second is strategy S5 with a probability of about 0.5. These two milling strategies are suitable for real machining. The probabilities associated with all other milling strategies are insufficient for them to be considered. The filtration line in FIG. 7 includes all the teaching models but the verification line excludes the present model of the part, which is in teaching procedure.

When teaching a neural network to predict surface quality, a batch learning method may be used. The input of neural network is a complete set of data vectors. In order to find out the probability of solution being "good" or "not good", an empty axon is linked to the DLL library (FIG. 15). Entering information about the pre-defined (desired) $R_a$ value (lb in FIG. 8) shows only that the neural network is qualified to predict the actual output $R_a$ value (1c in FIG. 8). Fifty test surfaces were used of which 20 were good and 30 were not good. During the teaching process only 3 surfaces were estimated as not good out of 20 good surfaces. Out of 30 not good surfaces only 1 surface was estimated as good.

Figure 8:
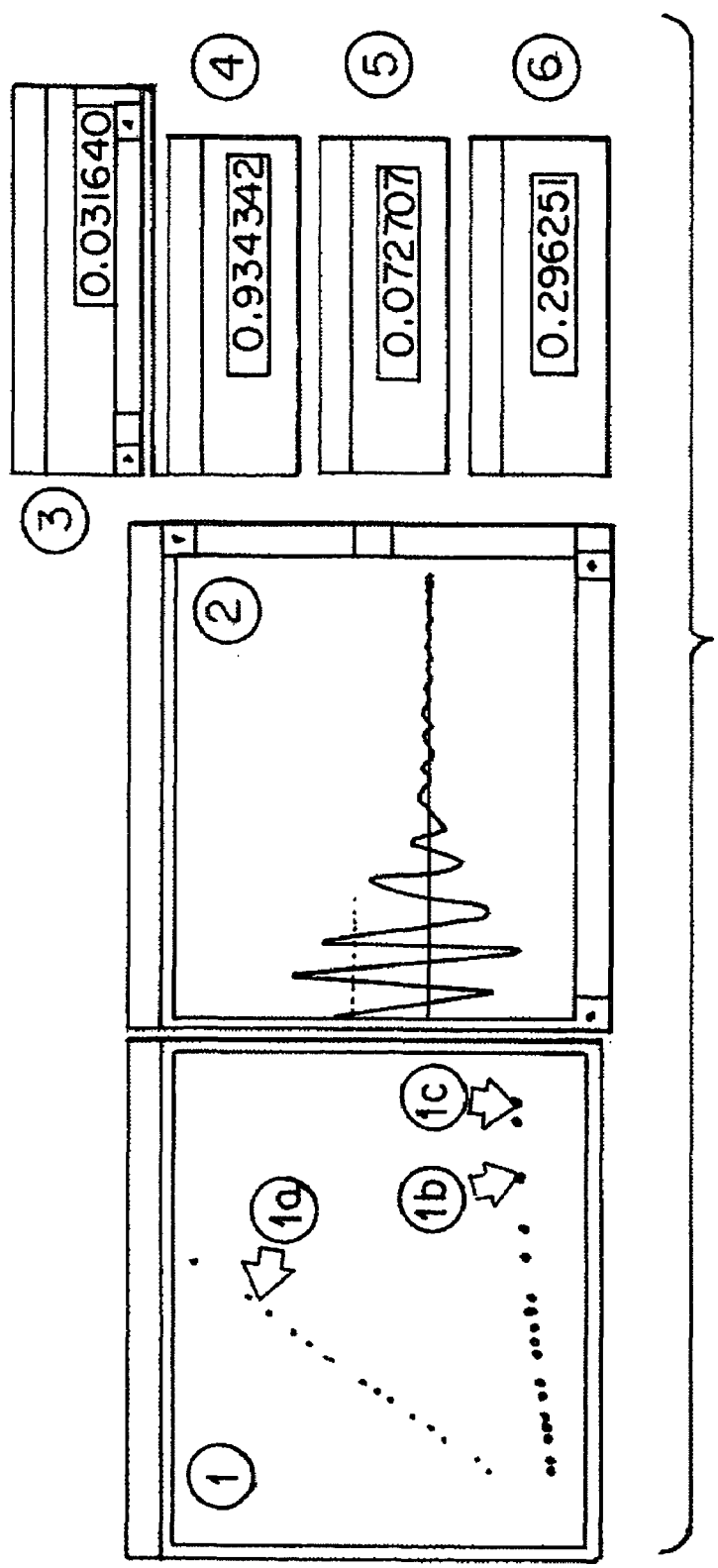
FIG. 8 shows output of a neural network according to the present invention.

It was found that the surface complexity index has the most significant influence on quality with a value of 17.9%. The machining ratio $n_{max}/v_{max}$ (max. spindle revolution/max. cutting speed) has an influence of 14.7%. The output of the neural network in the NeuroSolution environment [20] is shown in FIG. 8. (FIG. 8 shows (1) surface complexity index (SCI): (a) value of SCI, (b) predefined $R_a$ value(desired), (c) output value $R_a$ (actual); (2) performance measure of criterion (1); (3) average cost of criterion (1); (4) Correlation of criterion (1); (5) weights of synapse; and (6) weights of bias axons.)

Figure 9:
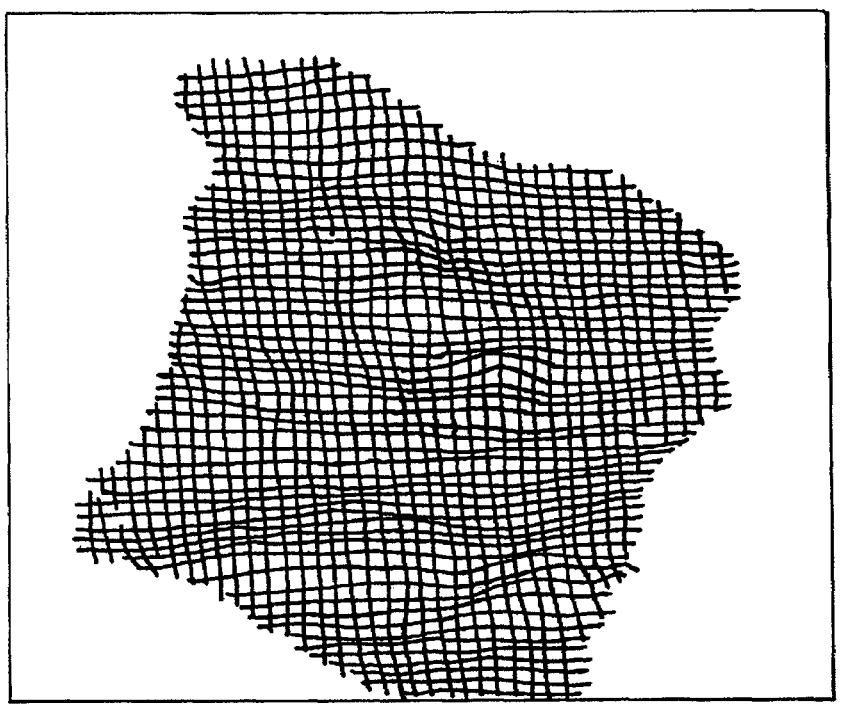
FIG. 9 shows a sculptured surface for testing the neural network according to the present invention.
Figure 10:
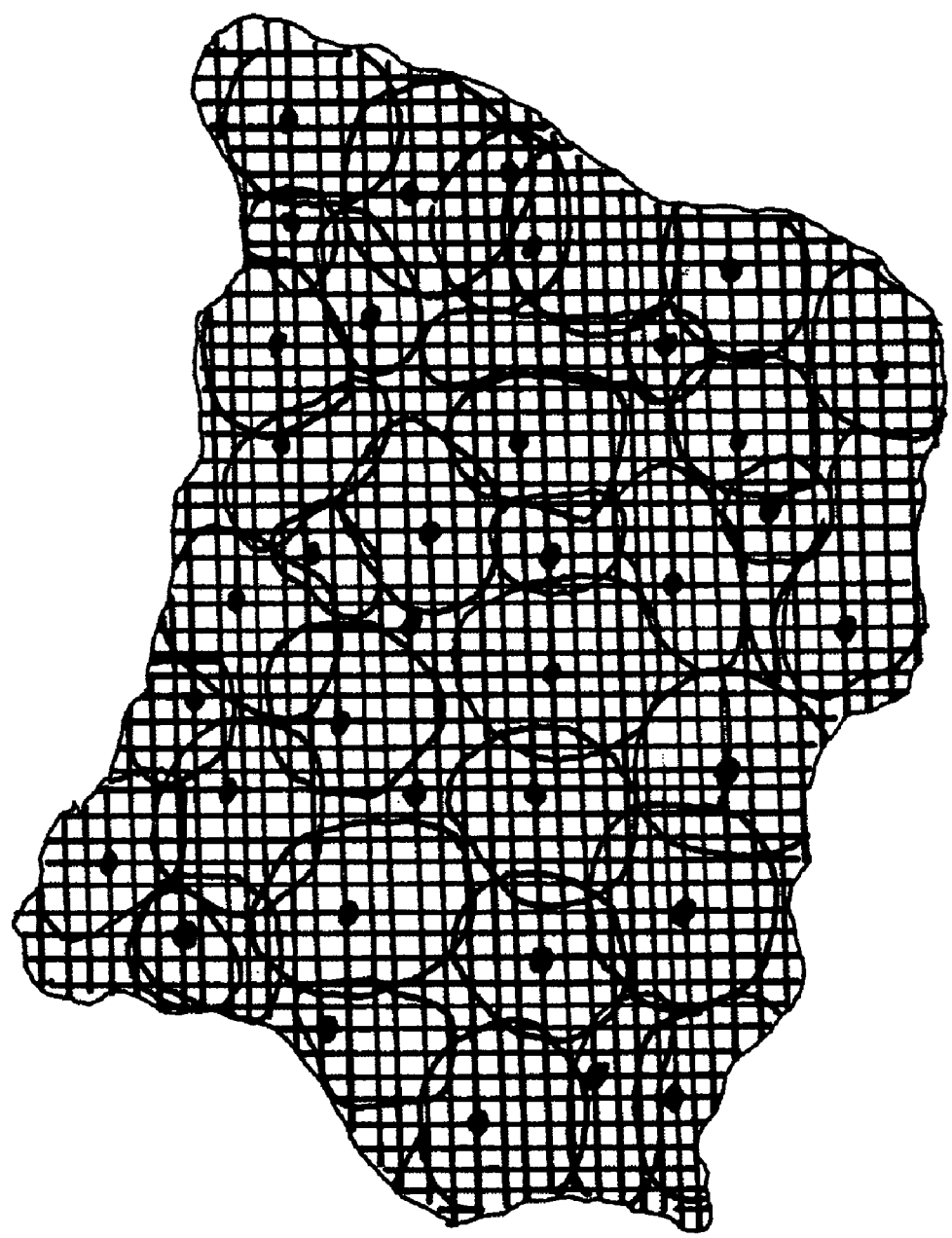
FIG. 10 shows subpatches created on the surface of FIG. 9 by the neural network according to the present invention.

Recognition of surfaces by neural network is difficult, especially if they are complex. Most industrial surfaces in tool production are very complex. Our neural network was tested on a very complex sculptured surface representing as shown in FIG. 9 (Complex sculptured surface for teaching—NURBS representation). This surface is also very difficult to machine specially with high speed cutting (HSC), which takes advantage of modern cutter materials. The surface model was translated into the VDA format, which is a suitable description for surface modeling. The neural network found 37 local centers, representing by central neuron, which are important in presenting the surface so that a decision can be made about manufacturability using the proposed milling strategy. This is a similar result to that obtained by a skilled engineer in a tool shop. In this way the neural network split each surface into several subpatches. In this case 1342 points were replaced by 37 surface patches, as shown in FIG. 10, showing neural network output of significant surface patches).

Next, the neural network is tested with several parts, which were not included in the teaching set. These parts have been selected from a tool shop engaged in the production of industrial tools for the manufacture of car lights, and representing typical milling procedures for this type of production. In total, six groups of such typical parts, and five machining procedures were selected.

If the neural network device has "learned" enough the generated neural network is, finally, accepted (diamond No. 3 in FIG. 6).

With respect to the functioning of the neural network device the modified controller can now function in a completely automated mode in which CAD data describing the model product from a commercial CAD/CAM system, which is capable of programming computer numerical control machines. The model is transmitted to the neural nework device, which first of all recognizes its geometric and technological features of the CAD model of the part. In effect, new model of the part is now built, based on the characteristic features, This model is then transmitted to the NN device, which determines the most suitable machining operations and cutting parameters (cutting speed, feed-rate and the depth of cutting), taking into account the level of performance (machining time, surface quality, machining costs) that is required.

The exit from the neural network device is an numerical control part program, which includes the G-codes (linear G01 or circular G02/G03 interpolation, etc.), the coordinates of cutter path, technological data (revolution speed Sxxxx, feed-rate Fxx, depth of cutting) and auxiliary data (coordinates of reference, zero and starting points, direction of rotation of the main spindle M021M03, change of cutting tools M06, etc.).

These data are then transmitted to an internal interface, which split the data in the numerical control program into tool path data (coordinates of movement along the X, Y, Z axes and/or rotations (A, B, C around the coordinate axis X, Y, Z) and data about functions (M, S, T).

Figure 11:
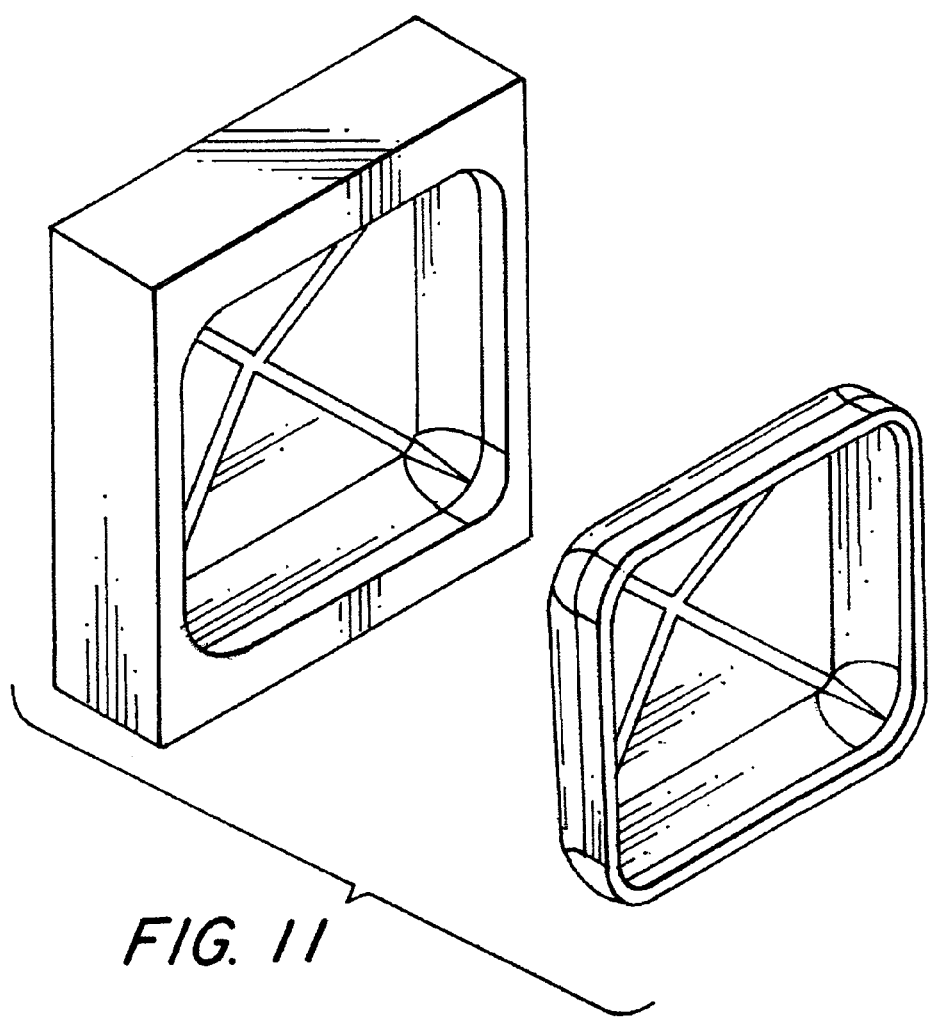
FIG. 11 shows a perspective view of a surface model of a car light switch body and mould

FIG. 11 shows a surface model of car light switch body (right) and mould (left). The neural network device was tested on a mould, on left (FIG. 11) for plastic injection of car light switch body (FIG. 11 (right)), which was not used in training the neural network, and not included into the training set. Its task is to predict milling path strategies to achieve the best possible surface quality.

Figure 12:
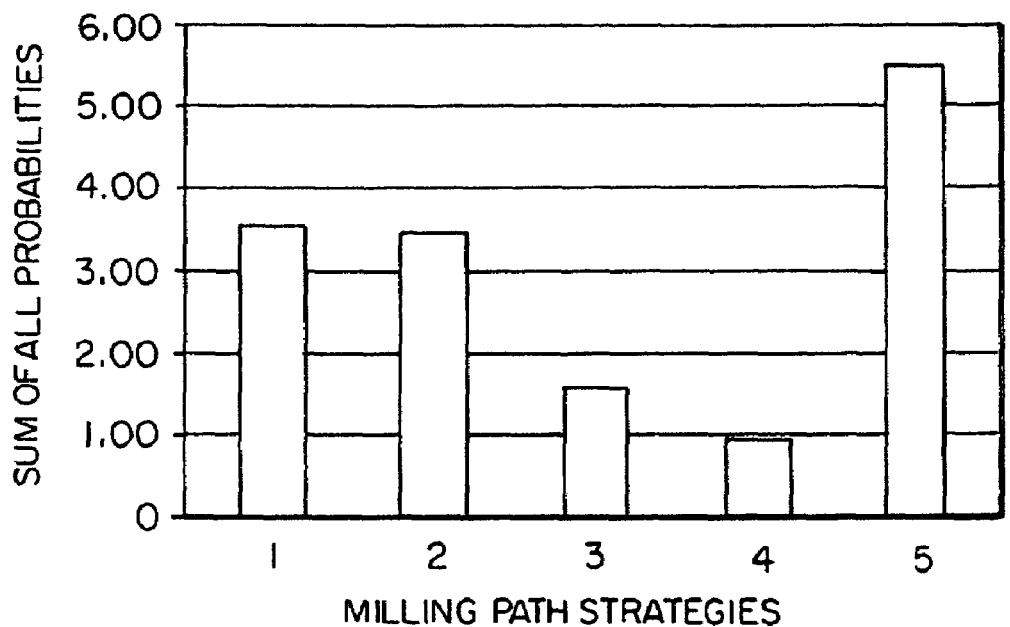
FIG. 12 is a graph showing the predicted probabilities for different milling path strategies obtained by a neural network device for the mould of FIG. 11.

FIG. 12 shows the predicted probabilities for different milling path strategies obtained by neural network device for the mould shown in FIG. 11. The NN device gave the highest probability to strategy number 5 (total sum of 5.46), which is profile finishing (equidistant machining with constant infeed). Strategy 1 (profile finishing) and strategy 2 (Z-finishing) received almost an equal probabilities (total sum 3.56 and 3.47).

Figure 13:
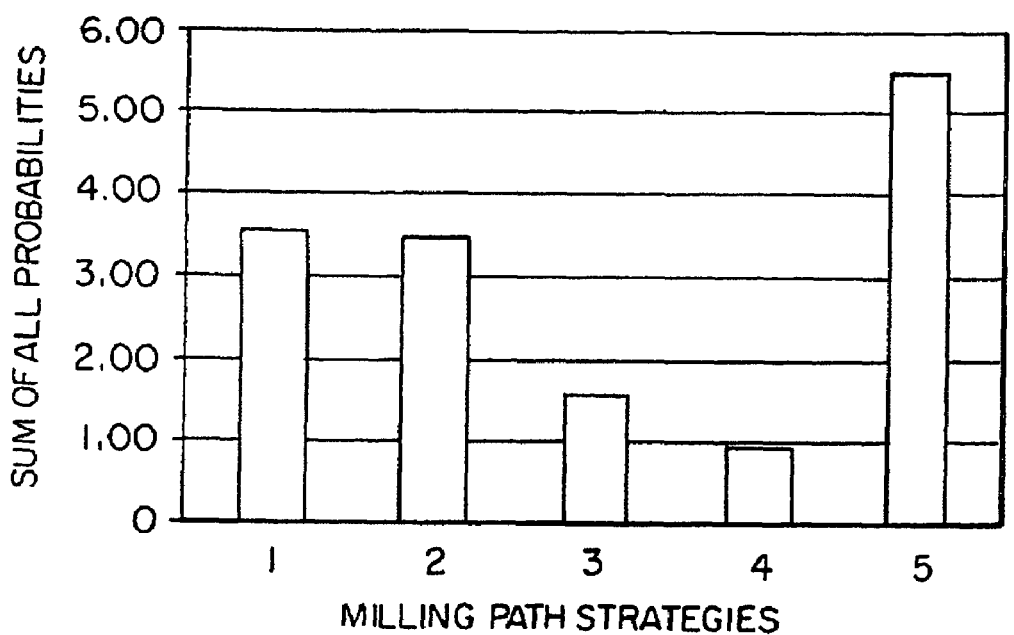
FIG. 13 is a graph showing average surface roughness achieved by the neural network device in FIG. 12.

In this example, the neural network predicted the probabilities to achieve the best centreline average roughness $R_a$ on the machined surface. The best $R_a$ was achieved with strategy 5. Using this strategy, almost 50% of the machined surface has a Ra value of about 0.45 µm, 30% achieve $R_a$ of about 0.7 µm, and 25% of machined surface achieved value has $R_a$ of about 0.85 µm (FIG. 7). The following two strategies in terms of surface quality, were strategy 2 and 3. As shown in FIG. 13, the machining results accord well with the predictions shown in FIG. 12. (FIG. 12 Legend for the milling path strategies, which are common in manufacturing part of CAD/CAM systems: No. 1 is profile finishing +Z-finishing; No. 2 is 3D finishing; No. 3 is profile finishing (scallop height mode); No. 4 is Z-level finishing; and No. 5 is profile finishing (equidistant machining, constant in-feed).) (FIG. 13 Legend for the bars: S1 is strategy No. 1 from FIG. 12; S3 is strategy No. 3 from FIG. 12; and S5 is strategy No. 5 from FIG. 12.

Figure 2:
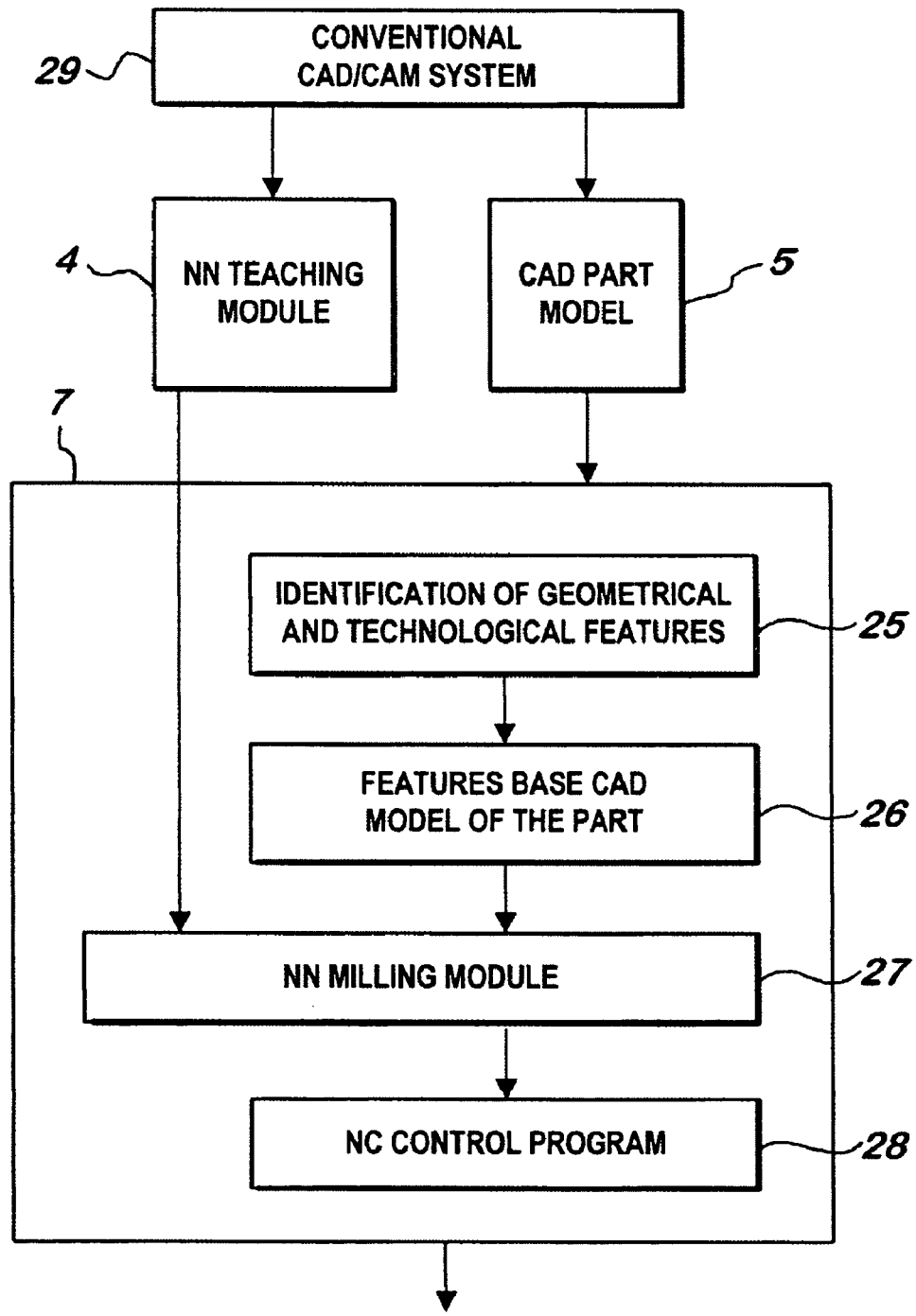
FIG. 2 shows a schematic layout of a neural network device according to the present invention.
Figure 14A:
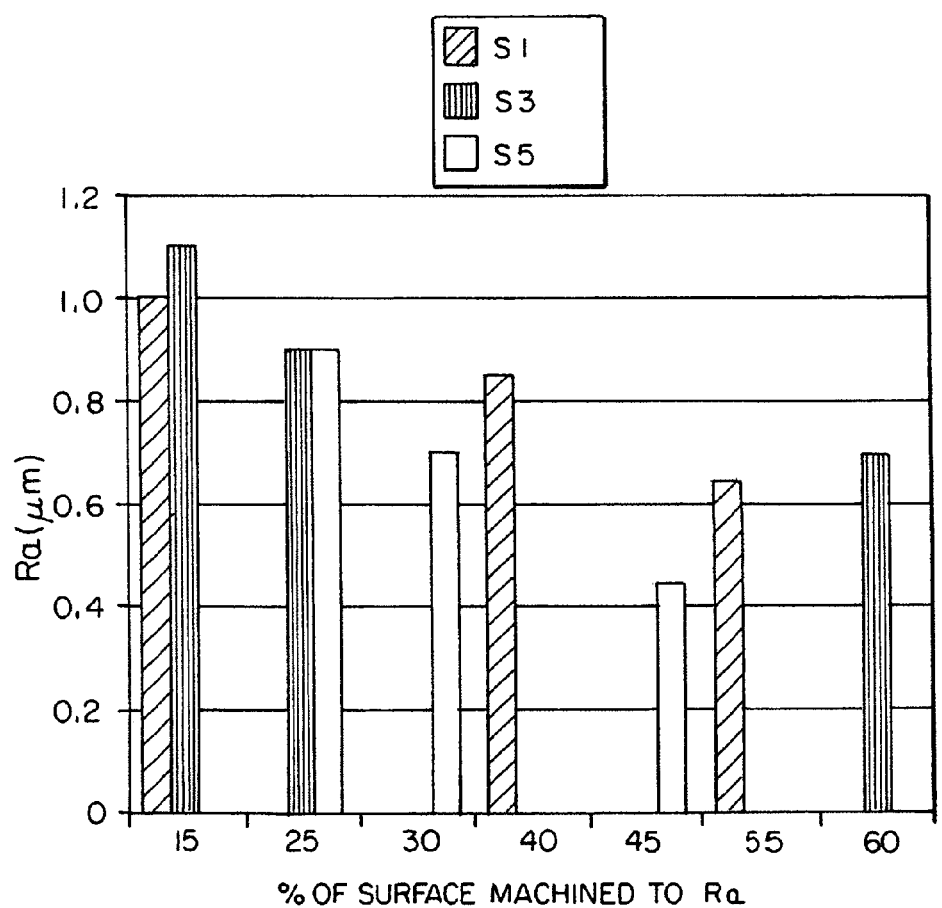
FIG. 14a. is a schematic view of another embodiment of the neural unit of FIG. 2, built into a PC outside the control unit.
Figure 14B:
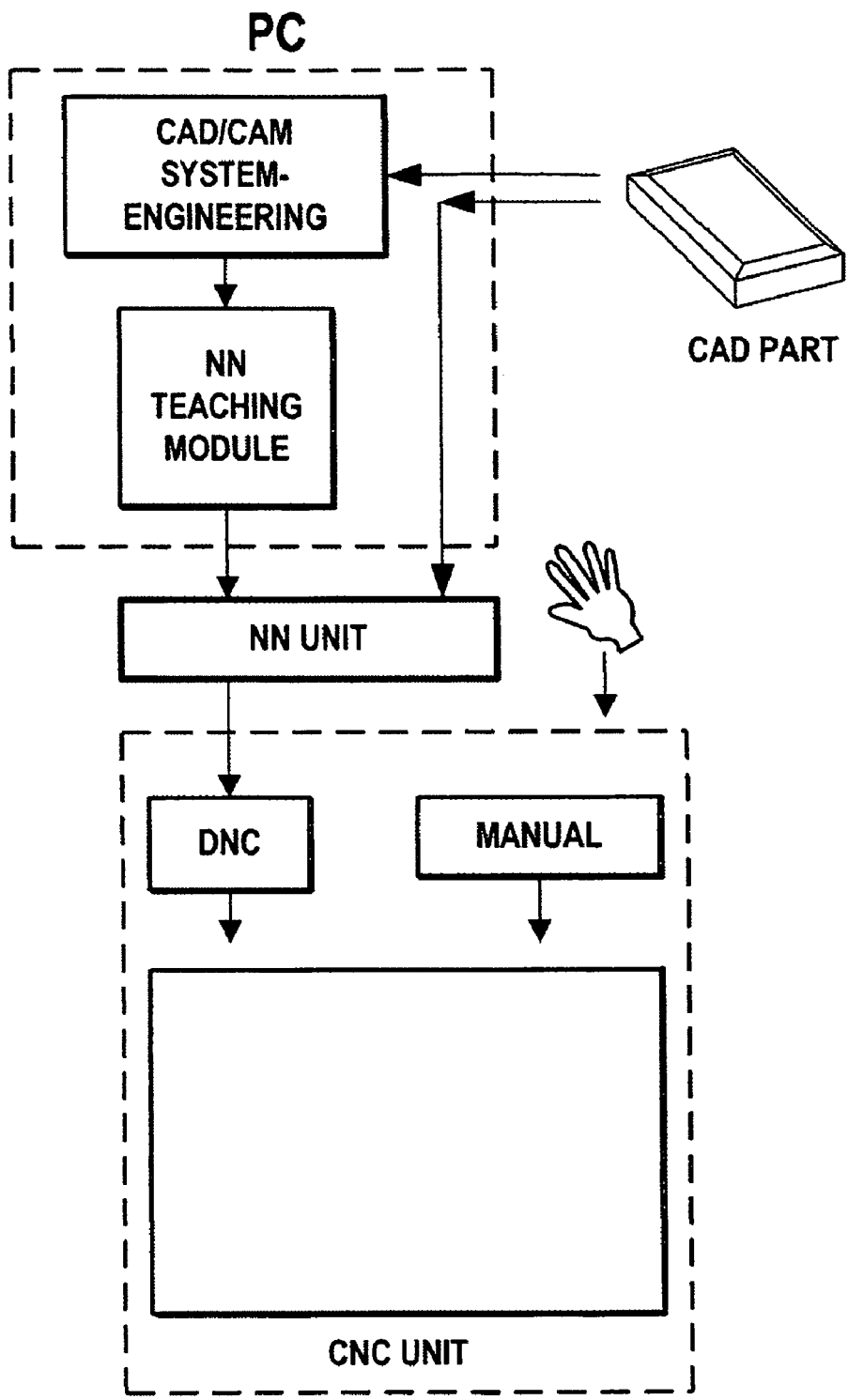
FIG. 14b. is a schematic view of another embodiment of the neural unit of FIG. 2, built as a stand-alone device.

The neural network device can be built-in into the computer numerical control unit of a milling machine, as shown in FIG. 2, in PC outside the control unit (FIG. 14(a)) or it may beside the control unit as stand-alone device (FIG. 14(b)). In both cases standard parallel transmission of data is used. If it is not possible to program the internal interface the NN device can be connected to an existing DNC interface. The NN device for teaching is connected to the NN device over a standard serial interface. The CAD model of the part is sent to the NN device across standard communications interface.

The present invention provides for a computer numerical control machining centre performing milling and similar operations, with the capability to learn and automatically and intelligently to generate part programs. The controller incorporates a neural network built into a special device, which can be taught by data from various commercially available CAD/CAM programming systems (Unigraphics Solution, I-Deas, Catia, HyperMill, etc.)

The new control unit solves the problem of the automatic and intelligent generation of numerical control part-programs for a computer numerical control machining centers. It can advise an numerical control programmer, and help in making correct decisions. At the moment, it is trained only for milling operations, and operations such as drilling and turning will require new training with different reference components. Future work requires also extensive training of the neural network.

What is claimed is:

1. A computer numerical control unit for machining centers with learning ability and ability of automatic intelligent generation of control programs, comprising a neural network device, a modified microcomputer, a comparison unit, a position measuring module and an amplifier, the improvement comprising a neural network device that takes instructions from a neural network teaching module that is not a constituent part of the computer numerical control unit and operates independently taking as a basis for its operation a data package received from a conventional CAD&CAM system, in order to operate as an intelligent programming module after a teaching process is completed and to automatically generate the numerical control program adequate for a given part to be processed in the machining centers; the numerical control program being fed to the modified micro computer including an internal interface with its first output connected to a position memory and its second output connected to a function memory, which accepts also manual input commands fed through a manual input module and a decoding unit; the modified microcomputer further includes a function program module, with its module input connected to the function memory and its output connected to an adaptable interface system, and an interpolation program module with its input connected to the position memory and its output connected to the comparison unit which has its other input connected to the output of the position measuring module, to which the position data are fed from a position meter, while the output of the comparison unit is connected to an amplifier which feeds geometric data to a step motor.

2. The computer numerical control unit for machining centers defined in claim 1, wherein in the mode of intelligent and automated processing of a CAD part model into a specific numerical control program the data package of the CAD part model is fed to the neural network device, which first identifies and classifies the individual geometric and technological features of the CAD part model and then builds a new CAD part model, which is transmitted to a neural network milling module, supplying on its output the numerical control program for the processed given part, the numerical control program being fed to an internal interface, which splits data in the numerical control program into a position package saved in the position memory and into function data saved in the function memory, wherein the function program module, containing the technological data, is transmitted through the adaptable interface system to a numerical control machine, while the numerical position program, generated in the interpolation program module, is sent over the comparison unit and the amplifier unit to the step motors of the numerical machine resulting in a movement either of parts support or of tools in accordance with the geometric data, wherein the position meter perceives the movement and sends a regulated size into the position measuring module, which transmits the data to the comparison unit, where the difference between the actual and the programmed position is calculated, while the geometric data are obtained from the numerical control program for each part and are treated in a position regulation circle.

3. The computer numerical control unit defined in claim 1, that can automatically generate the numerical control programs by means of an instructed neural network contained in the neural network teaching module 4 using engineering drawing module of parts, wherein in a learning phase, the neural network device is connected to the teaching module 4 which takes teaching numerical control programs for different parts defined in the engineering drawings module from a conventional CAD/CAM system, and wherein a decision on success of teaching process is taken in a decision module, subsequent to a testing module, so that in case the decision is NO, a path is active and repetition of the teaching process takes place, while on the other hand in case that the neural network device has learned enough, the path is active and a generated neural network is sent to the neural network device.

4. The computer numerical control unit for machining centers defined in claim 1, wherein the neural network device is realized in a microprocessor technique and contains an identification module that recognizes geometrical and technological features of different CAD part models, a generating module that produces a new feature based CAD models of parts, a neural network milling module, and an automatically generated numerical control program for a given part.

5. The computer numerical control unit defined in claim 1 wherein a neural network milling module enables intelligent, automatic generating of numerical control programs that enable machining operations, comprising milling, including face milling (rough), contour milling (rough), final milling following the contour and in Z-plane, final contour 3D milling, contour final milling, milling in Z-plane, final contour milling on the equidistant, and milling of pockets; drilling, including normal drilling, deep drilling, and center drilling; and reaming, sinking and threading; to be executed on prismatic parts.

6. The computer numerical control unit for machining centers defined in claim 1, wherein the numerical control programs are generated in a conventional CAD/CAM system based on engineering drawings of parts, the numerical control programs serving as teaching numerical control programs in the neural network teaching module 4 that instructs the neural network device, wherein the decision on success of teaching process is taken in a decision module, subsequent to a testing module, so that in case the decision is NO, a path is active and repetition of the teaching process takes place, while on the other hand in case that the-neural network device has learned enough, the path is active and a generated neural network is sent to the neural network device.

* * * * *